(12) United States Patent
Kurian et al.

(10) Patent No.: US 11,354,733 B2
(45) Date of Patent: Jun. 7, 2022

(54) EXTERNAL ENTITY CROSS-RELATIONAL DYNAMIC MATCHING SYSTEM

(71) Applicant: Bank of America Corporation, Charlotte, NC (US)

(72) Inventors: Manu Kurian, Dallas, TX (US); Lalit Dhawan, Franklin Park, NJ (US)

(73) Assignee: Bank of America Corporation, Charlotte, NC (US)

( * ) Notice: Subject to any disclaimer, the term of this patent is extended or adjusted under 35 U.S.C. 154(b) by 364 days.

(21) Appl. No.: 16/195,923

(22) Filed: Nov. 20, 2018

(65) Prior Publication Data

US 2020/0160416 A1    May 21, 2020

(51) Int. Cl.
G06Q 40/02    (2012.01)
G06Q 30/06    (2012.01)

(52) U.S. Cl.
CPC ....... *G06Q 40/025* (2013.01); *G06Q 30/0609* (2013.01); *G06Q 40/02* (2013.01)

(58) Field of Classification Search
CPC ... G06Q 40/025; G06Q 40/00; G06Q 30/0609
USPC .......................................... 705/35, 36 R, 38
See application file for complete search history.

(56) References Cited

U.S. PATENT DOCUMENTS

| | | | |
|---|---|---|---|
| 7,447,656 B2 * | 11/2008 | Parthasarathy | G06Q 40/00 370/427 |
| 7,447,659 B2 * | 11/2008 | Parthasarathy | G06Q 40/00 705/35 |
| 7,546,267 B2 | 6/2009 | Wallman | |
| 7,552,082 B2 | 6/2009 | Wallman | |
| 7,698,203 B1 | 4/2010 | Eichner et al. | |
| 7,827,081 B2 | 11/2010 | Sinha et al. | |
| 7,925,567 B2 | 4/2011 | McRedmond | |
| 7,933,825 B2 | 4/2011 | Mintz | |
| 8,099,344 B2 | 1/2012 | Wallman | |
| 8,447,682 B2 | 5/2013 | Mintz | |
| 8,468,078 B2 | 6/2013 | Vioni et al. | |
| 8,606,695 B1 * | 12/2013 | Arora | G06Q 40/02 705/38 |
| 9,070,165 B2 | 6/2015 | Vioni et al. | |

(Continued)

OTHER PUBLICATIONS

Uzzi et al. "Relational embeddedness and learning: The case of bank loan managers and their clients." 2003, Management science 49.4: 383-399. (Year: 2003).*

*Primary Examiner* — Kelly S. Campen
(74) *Attorney, Agent, or Firm* — Banner & Witcoff, Ltd.

(57) ABSTRACT

Systems for providing cross-relational matching functionality are provided. In some examples, a system may receive a request for a product which may be evaluated to determine whether a requesting user qualifies for the product. If so, the product may be approved and cross-relational matching functionality may be enabled. A plurality of eligible users may be identified. The plurality of eligible users may be identified as potentially interested in assisting in providing the product to the requesting user. Each eligible user of the plurality of eligible users may be evaluated (e.g., using machine learning) to determine whether the user matches one or more predetermined rules or qualifications as likely to be interested in providing the product. If so, the eligible user may be added to a subset of eligible users.

21 Claims, 14 Drawing Sheets

(56) References Cited

U.S. PATENT DOCUMENTS

| | | | |
|---|---|---|---|
| 2003/0036993 A1* | 2/2003 | Parthasarathy | G06Q 40/00 705/38 |
| 2006/0190394 A1* | 8/2006 | Fraser | G06Q 40/025 705/38 |
| 2006/0277123 A1* | 12/2006 | Kennedy | G06Q 40/025 705/35 |
| 2007/0061248 A1* | 3/2007 | Shavit | G06Q 40/06 705/37 |
| 2007/0067229 A1* | 3/2007 | Parthasarathy | G06Q 40/08 705/35 |
| 2007/0073613 A1* | 3/2007 | Lee | G06Q 40/00 705/38 |
| 2013/0138552 A1* | 5/2013 | Oskolkov | G06Q 20/24 705/38 |
| 2016/0042451 A1* | 2/2016 | Raessler | G06Q 40/025 705/38 |
| 2016/0232546 A1* | 8/2016 | Ranft | G06Q 40/025 |
| 2018/0075527 A1* | 3/2018 | Nagla | G06Q 40/025 |
| 2018/0330437 A1* | 11/2018 | Raessler | G06Q 40/025 |
| 2019/0102835 A1* | 4/2019 | Bjonerud | H04L 65/403 |

\* cited by examiner

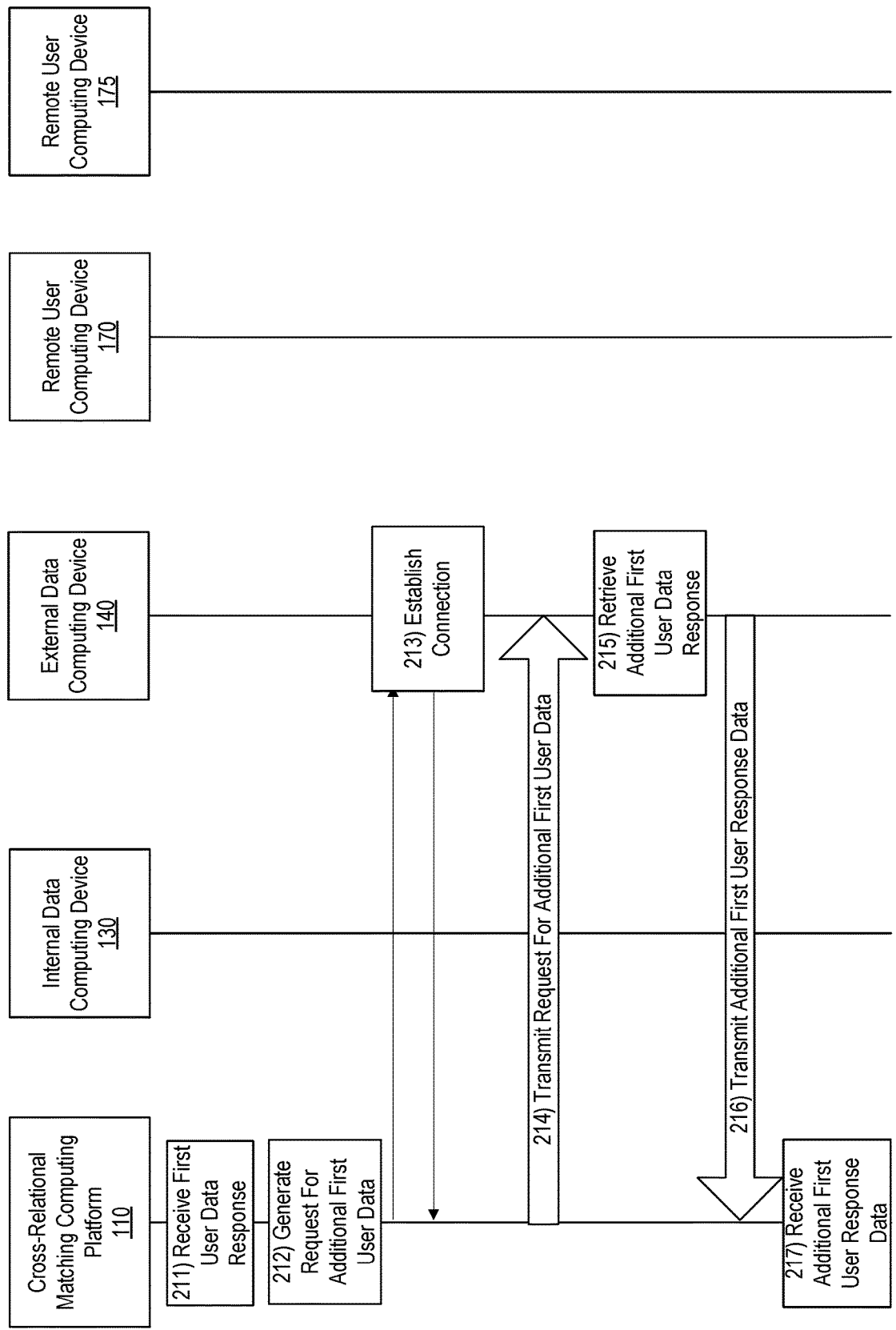

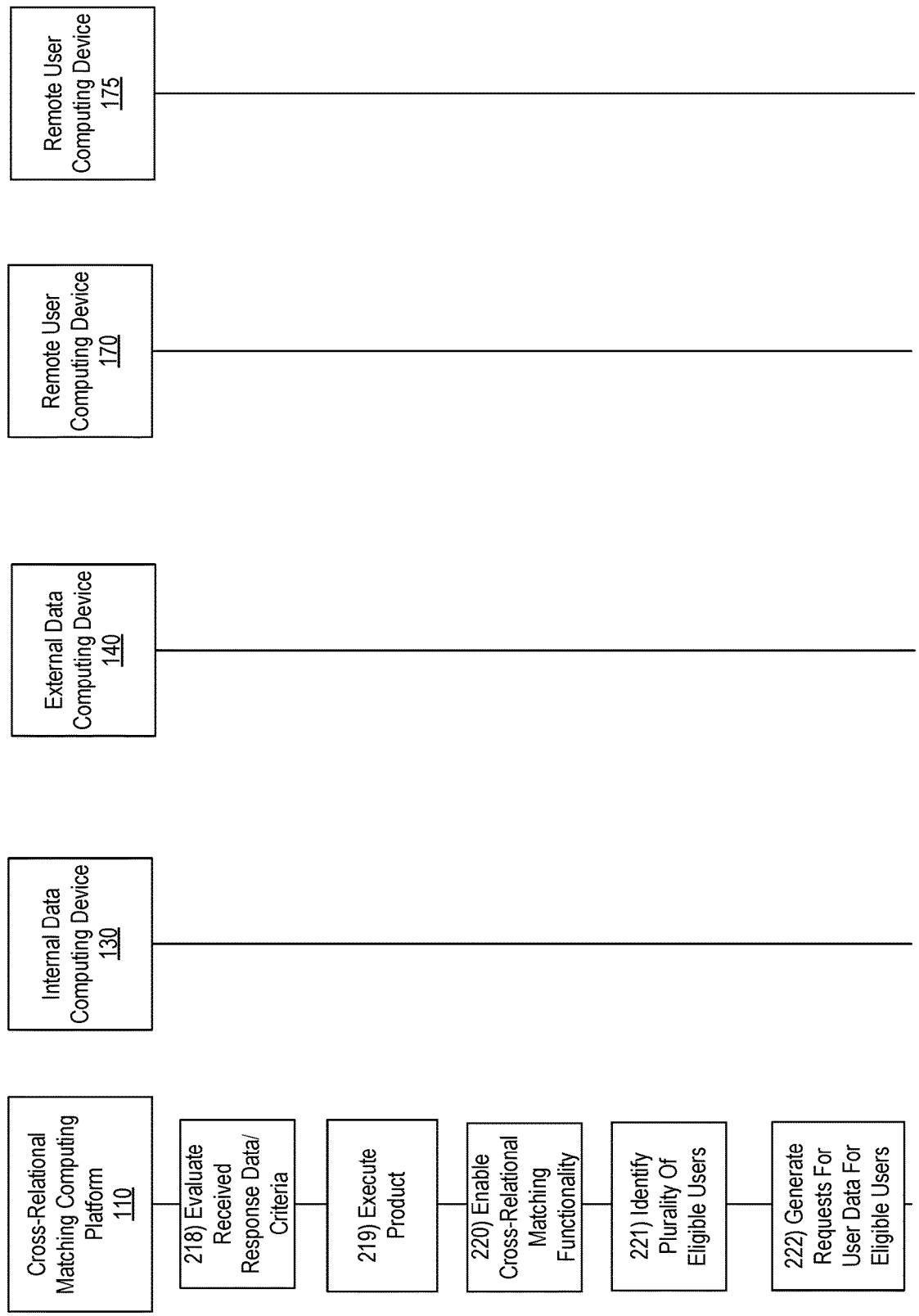

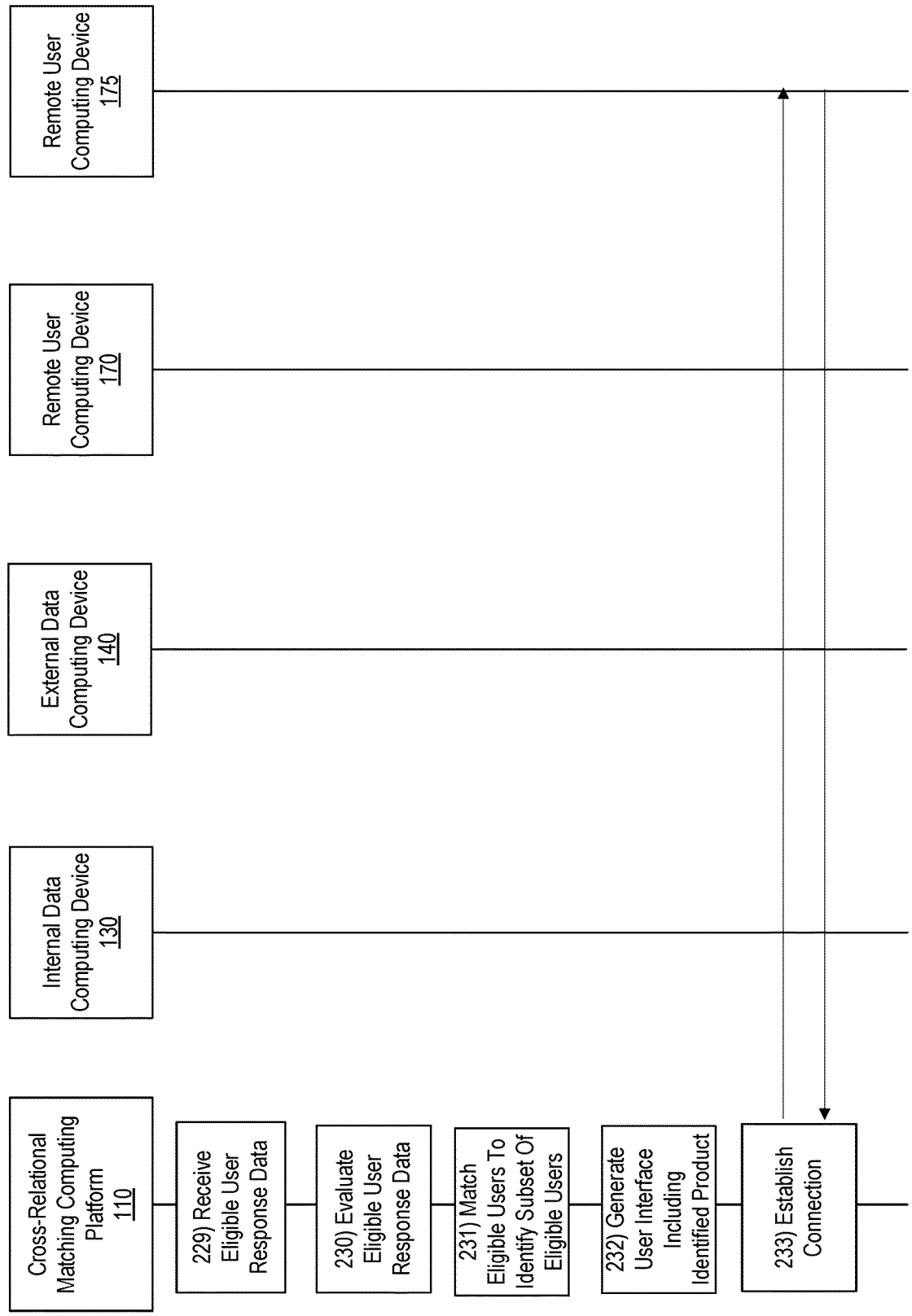

EXTERNAL ENTITY CROSS-RELATIONAL DYNAMIC MATCHING SYSTEM

BACKGROUND

Aspects of the disclosure relate to electrical computers, systems, and machine learning. In particular, one or more aspects of the disclosure relate to evaluating a request, enabling and executing cross-relational matching functionality.

As users are being creative in the types of products they are obtaining and how they are obtained, providers of those products are also becoming more creative in how the products are provided, parameters of products, and the like. In some examples, providers of products are looking for ways to include other individuals, such as external entities or individuals, in providing a product. However, identifying and targeting individuals who might be interested or who would be open to participating in a creative arrangement for providing a product may be difficult. Accordingly, it would be advantageous to provide cross-relational matching functions to identify individuals.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with identifying and providing a product to a user and identifying cross-relational matching opportunities.

In some examples, a system, computing platform, or the like, may receive a request for a product. In some examples, the request may be evaluated to determine whether a requesting user qualifies for the product. If so, the product may be approved and cross-relational matching functionality may be enabled.

For instance, a plurality of eligible users may be identified. In some examples, the plurality of eligible users may be users different from the user requesting the product and may be identified as potentially interested in assisting in providing the product to the requesting user. Each eligible user of the plurality of eligible users may be evaluated (e.g., using machine learning) to determine whether the user matches one or more predetermined rules or qualifications as likely to be interested in providing the product. If so, the eligible user may be added to a subset of eligible users.

The system, computing platform, or the like, may generate one or more user interfaces displaying the product and/or other products available for selection and the user interface may be transmitted to computing devices associated with the subset of eligible users. The system, computing platform, or the like, may receive selection of the product from the user interface, may generate one or more product feature modifications and may execute the one or more product feature modifications.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing cross-relational matching functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to cross-relational matching functionality.

As mentioned above, identifying eligible users interested in providing a product to a requesting user may be difficult. Accordingly, using cross-relational matching functionality to identify one or more eligible users and present one or more options to the one or more eligible users may be advantageous.

Aspects described herein are directed to identifying a plurality of eligible users to may be interested in providing a product to a user. Each eligible user of the plurality of eligible users may be evaluated to determine whether the eligible user matches one or more predetermined rules, criteria, or the like. If so, the eligible user may be added to a subset of eligible user that may be presented with an option to select the product, provide the product, or the like. In some examples, the subset of eligible users may be fewer than all eligible users in the plurality of eligible users.

Further aspects may include receiving selection of a product by one or more of the eligible users of the subset of eligible users and generating and executing one or more product feature modifications.

These and various other arrangements will be discussed more fully below.

Figure 1A:
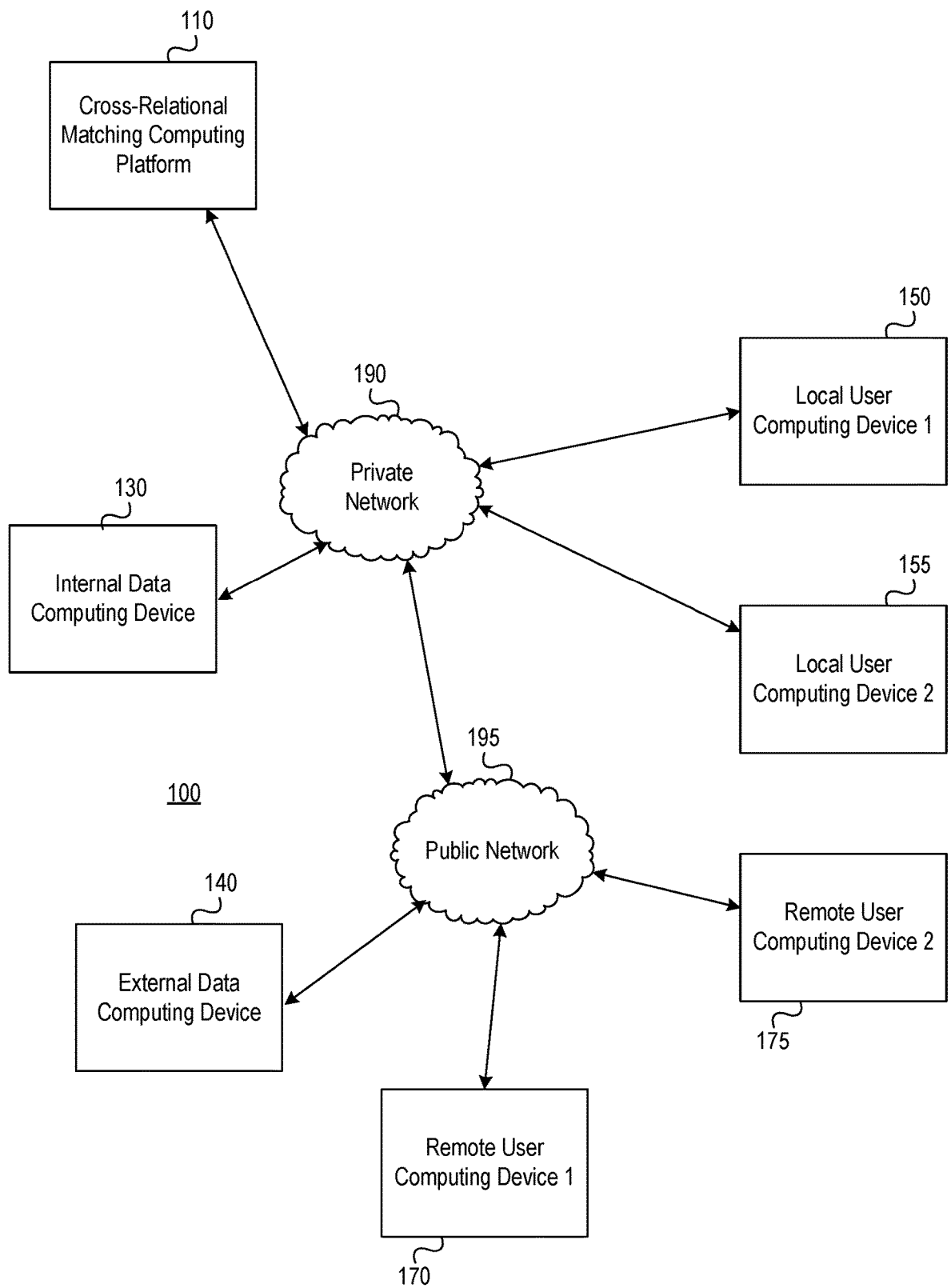
FIGS. 1A and 1B depict an illustrative computing environment for implementing cross-relational matching functions in accordance with one or more aspects described herein.
Figure 1B:
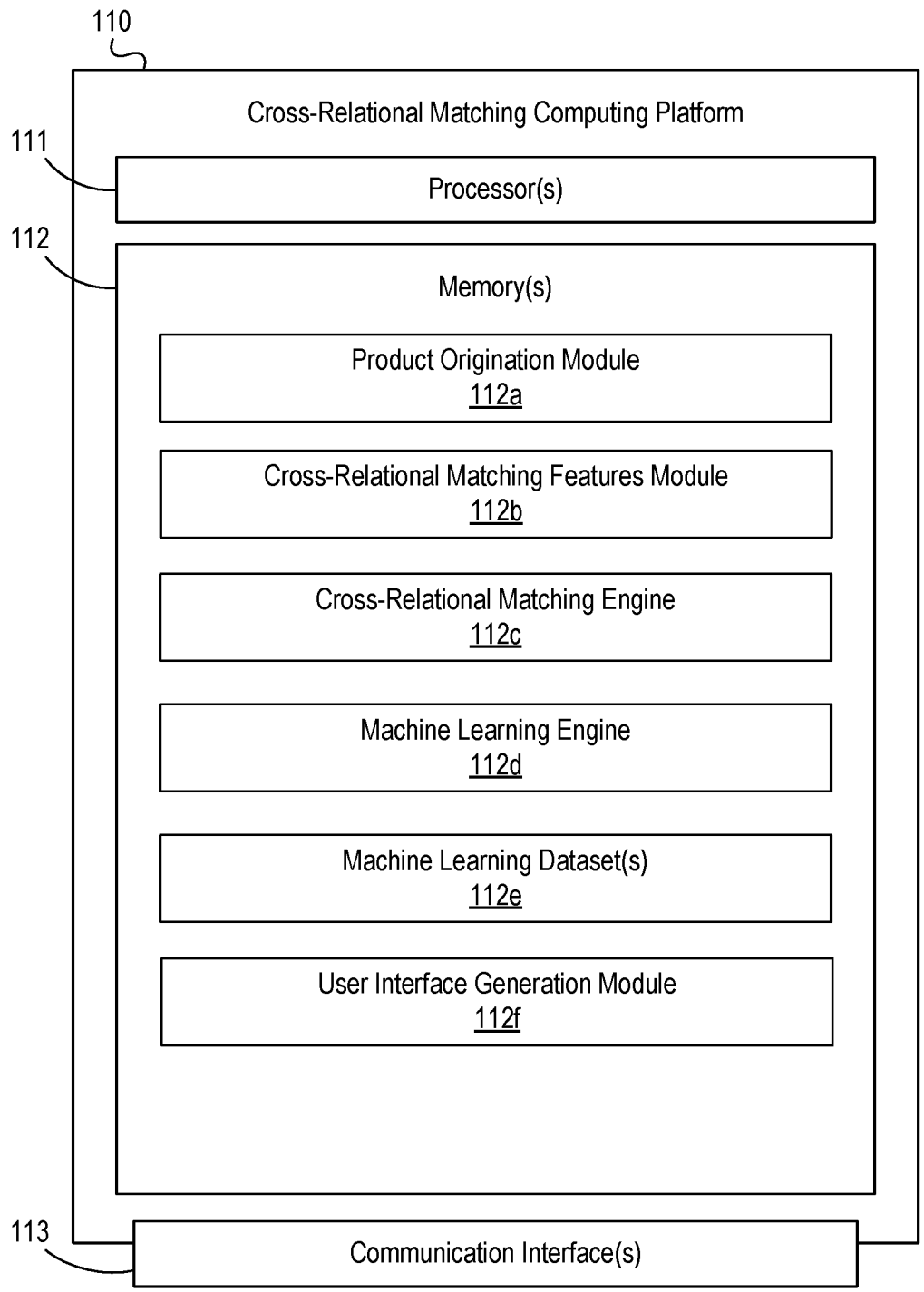

FIGS. 1A and 1B depict an illustrative computing environment for implementing and using a system for cross-relational matching in accordance with one or more aspects described herein. Referring to FIG. 1A, computing environment 100 may include one or more computing devices and/or other computing systems. For example, computing environment 100 may include cross-relational matching computing platform 110, internal data computing device 130, external data computing device 140, a first local user computing device 150, a second local user computing device 155, a first remote user computing device 170, and a second remote user computing device 175.

Cross-relational matching computing platform 110 may be configured to host and/or execute a machine learning engine to provide intelligent, dynamic evaluation of user product requests and cross-relational matching. For instance, cross-relational matching computing platform 110 may receive a request for a product from a user computing device. For instance, a request for, for example, a loan, may be received from a remote user computing device 170 associated with a first user (e.g., a borrower). The request may be analyzed and the cross-relational matching computing platform 110 may generate requests for first user information. In some examples, the first user information may be retrieved from an internal data computing device 130, an external data computing device 140, or the like.

First user response data may be received by the cross-relational matching computing platform 110 and may be analyzed to determine whether the first user qualifies for the requested product. If not, a notification may be transmitted to the first user. If so, in some examples, one or more cross-relational matching functions may be enabled.

For instance, the cross-relational matching functions may include identifying a plurality of eligible users who are eligible to provide funds to provide the loan to the first user. Accordingly, although the first user may apply for or request the product (e.g., the loan) via a financial institution, one or more individual users may be eligible to provide funds for the loan and thereby earn a return on the individual's investment. Thus, the plurality of eligible users may include users different from the first user requesting the product.

The cross-relational matching computing platform 110 may retrieve information associated with the plurality of eligible users and may match, via a cross-relational matching engine, a subset of the plurality of eligible users to the first user, requested product, or the like. The cross-relational matching computing platform 110 may generate a user interface including one or more options for investment for the subset of the plurality of eligible users. In some examples, the user interface may include the requested product as one selectable option presented via the user interface.

If one or more of the subset of eligible users selects the requested product, selection response data may be transmitted to the cross-relational matching computing platform 110 and one or more parameters or characteristics of the requested product may be modified. For instance, an interest rate may be modified, a term may be modified, or the like. The modifications may be executed and a notification may be transmitted to the first user (e.g., via remote user computing device 170).

Internal data computing device 130 may be a computing device configured to process, store, and the like, data associated with one or more users and internal to the entity implementing the cross-relational matching computing platform 110. For instance, internal data computing device 130 may store information such as account numbers of users, contact information, purchase history, loan history, credit score, and the like.

External data computing device 140 may be a computing device configured to process, store and the like, data associated with one or more users and external to the entity implementing the cross-relational matching computing platform 110 (e.g., publicly available information, and the like). For instance, external data computing device 140 may store information such as market data, current interest rate data, credit scores, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the cross-relational matching computing platform 110 and/or internal data computing device 130 to control parameters of the system, update or execute rules, modify settings, display notifications, and the like.

The remote user computing devices 170, 175 may be used to communicate with, for example, cross-relational matching computing platform 110. For instance, remote user computing devices 170, 175 may include user computing devices, such as mobile devices including smartphones, tablets, laptop computers, and the like, that may be used to communicate with cross-relational matching computing platform 110, request products, display user interfaces, display notifications, and the like.

In one or more arrangements, internal data computing device 130, external data computing device 140, local user computing device 150, local user computing device 155, remote user computing device 170, and/or remote user computing device 175 may be any type of computing device or combination of devices configured to perform the particular functions described herein. For example, internal data computing device 130, external data computing device 140, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 130, external data computing device 140, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include cross-relational matching computing platform 110. As illustrated in greater detail below, cross-relational matching computing platform 110 may include one or more computing devices configured to perform one or more of the functions described herein. For example, cross-relational matching computing platform 110 may include one or more computers (e.g., laptop computers, desktop computers, servers, server blades, or the like).

As mentioned above, computing environment 100 also may include one or more networks, which may interconnect one or more of cross-relational matching computing platform 110, internal data computing device 130, external data computing device 140, local user computing device 150, local user computing device 155, remote user computing device 170, and/or remote user computing device 175. For example, computing environment 100 may include private network 190 and public network 195. Private network 190 and/or public network 195 may include one or more subnetworks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, cross-relational matching computing platform 110, internal data computing device 130, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect cross-relational matching computing platform 110, internal data computing device 130, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., cross-relational matching computing platform 110, internal data computing device 130, local user computing device 150, local user computing device 155) with one or more networks and/or computing devices that are not associated with the organization. For example, external data computing device 140, remote user computing device 170, and/or remote user computing device 175 might not be associated with an organization that operates private network 190 (e.g., because external data computing device 140, remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect external data computing device 140, remote user computing device 170 and remote user computing device 175 to private network 190 and/or one or more computing devices connected thereto (e.g., cross-relational matching computing platform 110, internal data computing device 130, local user computing device 150, local user computing device 155).

Referring to FIG. 1B, cross-relational matching computing platform 110 may include one or more processors 111, memory 112, and communication interface 113. A data bus may interconnect processor(s) 111, memory 112, and communication interface 113. Communication interface 113 may be a network interface configured to support communication between cross-relational matching computing platform 110 and one or more networks (e.g., private network 190, public network 195, or the like). Memory 112 may include one or more program modules having instructions that when executed by processor(s) 111 cause cross-relational matching computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cross-relational matching computing platform 110 and/or by different computing devices that may form and/or otherwise make up cross-relational matching computing platform 110.

For example, memory 112 may have, store and/or include a product origination module 112a. Product origination module 112a may store instructions and/or data that may cause or enable the cross-relational matching computing platform 110 to receive a request for a product, such as a loan, request and receive information about a first user requesting the product, evaluate the user with respect to product criteria, approve or deny the request, and the like. In some examples, product origination module 112a may identify a particular product to offer to the first user requesting the product. For instance, if the first user requests a product in a particular category (e.g., small business loan), the product origination module 112a may identify a particular product or type of product to offer to the first user.

Cross-relational matching computing platform 110 may further have, store and/or include cross-relational matching features module 112b, cross-relational matching features module 112b may store instructions and/or data that may cause or enable the cross-relational matching computing platform 110 to enable one or more cross-relational matching features. For instance, in response to approval of a product, evaluation of criteria, or the like (e.g., by the product origination module) one or more cross-relational matching functions may be enabled. The cross-relational matching functions may include functions associated with evaluating potential eligible users to invest in the product (e.g., provide funds to be provided via the loan), receive selection of a product from one or more eligible users, modify parameters of the product (e.g., interest rate, term, or the like), execute modified parameters, and the like. In some examples, cross-relational matching features module 112b may generate one or more user interfaces, notifications, or the like.

Cross-relational matching computing platform 110 may further have, store and/or include cross-relational matching engine 112c. Cross-relational matching engine 112c may store instructions and/or data that may cause or enable the cross-relational matching computing platform 110 to identify potential eligible users that may invest in the product, retrieve data associated with the eligible users, and/or identify a subset of the eligible users to whom the product may be offered for investment based on matching the eligible users, data associated with the eligible users, and the like, to one or more predetermined criteria, one or more criteria of the product, or the like.

In some arrangements, machine learning may be used to evaluate eligible users, identify eligible users matching one or more criteria, and the like. For instance, cross-relational matching computing platform 110 may have, store and/or include a machine learning engine 112d and machine learning datasets 112e. Machine learning engine 112d and machine learning datasets 112e may store instructions and/or data that may cause or cross-relational matching computing platform 110 to evaluate potential eligible users, evaluate data retrieved for the eligible users and identify a subset of users based on matching the criteria of the users to criteria of the product, projected interests, or the like. The machine learning datasets 112e may be generated based on analyzed data (e.g., data from previously received data, previously identified subsets of eligible users, behavioral data, purchase data, and the like), raw data, and/or received from one or more outside sources.

The machine learning engine 112d may receive data related to one or more eligible users and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e.

In some examples, the machine learning datasets 112e may include machine learning data linking one or more characteristics of an eligible user (e.g., purchase history, behavior data, or the like) to one or more products, types of products, categories of products, or the like. For instance, the machine learning datasets 112e may include machine learning data linking one or more users interested in building small local businesses with a small business loan for a local entity. This information may be used to identify and/or generate a subset of the identified eligible users to whom an offer to invest in one or more products may be transmitted.

Cross-relational matching computing platform 110 may further have, store and/or include a user interface generation module 112f. The user interface generation module 112f may store instructions and/or data that may cause or enable the cross-relational matching computing platform 110 to generate one or more user interfaces including one or more products available for investment and may transmit the generated one or more user interfaces to the identified subset of eligible users.

In some examples, user interface generation module 112f may further generate one or more notifications that may be transmitted to computing devices associated with the user requesting the product, users being presented with an offer to invest in a product, and the like.

FIGS. 2A-2H depict an illustrative event sequence for implementing and using cross-relational matching functions in accordance with one or more aspects described herein. The events shown in the illustrative event sequence are merely one example sequence and additional events may be added, or events may be omitted, without departing from the invention.

Figure 2A:
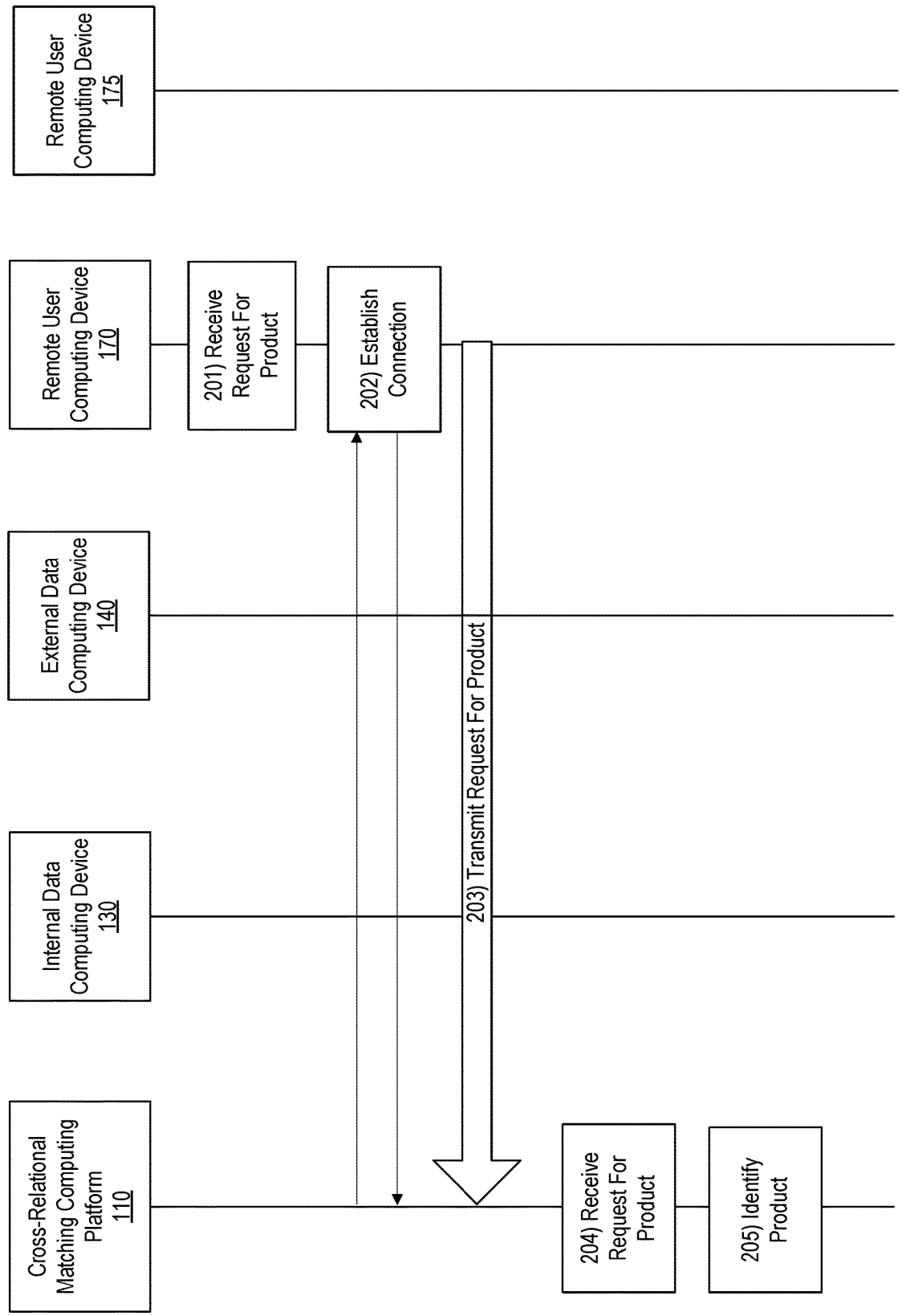

Referring to FIG. 2A, at step 201, a request for a product may be received by a computing device of a first user. For instance, a first user may input a request for a product into a remote user computing device 170. The request may include a request for a particular product, type of product, or the like. In some examples, the request for a product may include a request for a loan from, for example, a financial institution (e.g., an entity implementing the cross-relational matching computing platform 110). In some example, the request for a product may include additional information, such as information about the first user requesting the product (e.g., name, contact information, account information if available, and the like), parameters of the product (e.g., amount of loan, requested term, desired features, and the like), and the like.

At step 202, a connection may be established between the remote user computing device 170 and the cross-relational matching computing platform 110. For instance, a first wireless connection may be established between the remote user computing device 170 and the cross-relational matching computing platform 110. Upon establishing the first wireless connection, a communication session may be initiated between the cross-relational matching computing platform 110 and the remote user computing device 170.

At step 203, the request for the product may be transmitted from the remote user computing device 170 to the cross-relational matching computing platform 110. For instance, the request for the product may be transmitted during the communication session initiated upon establishing the first wireless connection.

At step 204, the request for the product may be received by the cross-relational matching computing platform 110. At step 205, the request may be analyzed and a product may be identified. For instance, the request and any additional accompanying data may be analyzed to identify the product being requested, a particular type of product that meets the requested parameters, or the like.

Figure 2B:
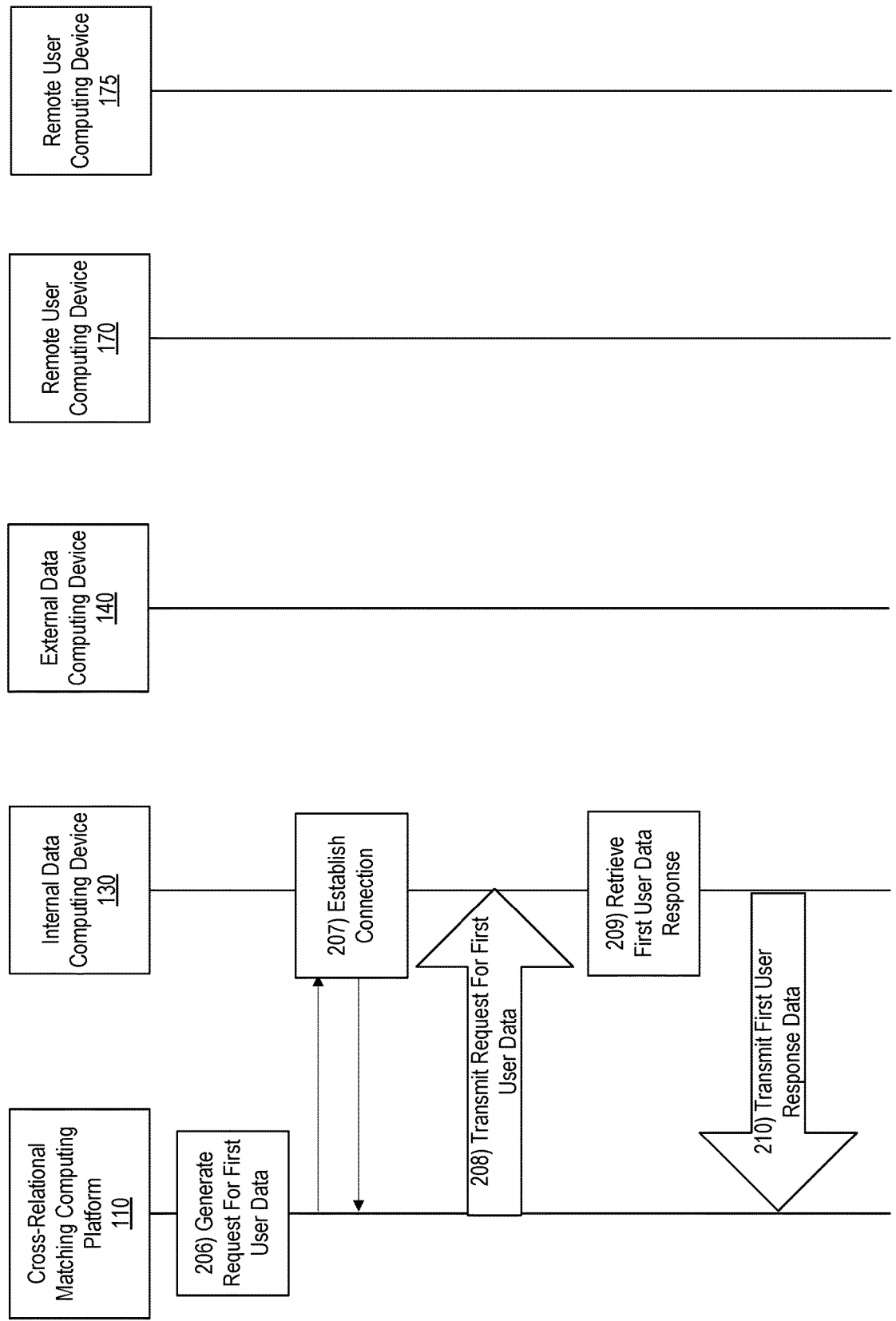

With reference to FIG. 2B, at step 206, a request for user data of the first user may be generated. For instance, the cross-relational matching computing platform 110 may generate a request for data associated with the first user to evaluate whether the user can qualify for the requested product. In some examples, the request may be a request for internal data, such as account history, purchase history, loan history, and the like.

At step 207, a connection may be established between the cross-relational matching computing platform 110 and internal data computing device 130. For instance, a second wireless connection may be established between the cross-relational matching computing platform 110 and the internal data computing device 130. Upon establishing the second wireless connection, a communication session may be initiated between the cross-relational matching computing platform 110 and the internal data computing device 130.

At step 208, the request for first user data may be transmitted from the cross-relational matching computing platform 110 to the internal data computing device 130. For instance, the request for first user data may be transmitted during the communication session initiated upon establishing the second wireless connection.

At step 209, the request for first user data may be received and first user response data may be retrieved. For instance, first user response data responsive to the request for first user data may be retrieved from, for example, one or more databases within the internal data computing device 130 or connected to or in communication therewith.

At step 210, the first user response data may be transmitted from the internal data computing device 130 to the cross-relational matching computing platform 110.

With reference to FIG. 2C, at step 211, the first user response data may be received by the cross-relational matching computing platform 110.

At step 212, another request for user data of the first user may be generated. For instance, the cross-relational matching computing platform 110 may generate a request for data associated with the first user to evaluate whether the user can qualify for the requested product. In some examples, the request may be a request for external data, such as purchase history, credit score, market conditions, and the like.

At step 213, a connection may be established between the cross-relational matching computing platform 110 and external data computing device 140. For instance, a third wireless connection may be established between the cross-relational matching computing platform 110 and the external data computing device 140. Upon establishing the third wireless connection, a communication session may be initiated between the cross-relational matching computing platform 110 and the external data computing device 140.

At step 214, the request for first user data may be transmitted from the cross-relational matching computing platform 110 to the external data computing device 140. For instance, the request for first user data may be transmitted during the communication session initiated upon establishing the third wireless connection.

At step 215, the request for first user data may be received and first user response data may be retrieved. For instance, first user response data responsive to the request for first user data may be retrieved from, for example, one or more databases within the external data computing device 140 or connected to or in communication therewith.

At step 216, the first user response data may be transmitted from the external data computing device 140 to the cross-relational matching computing platform 110. At step 217, the transmitted first user response data may be received by the cross-relational matching computing platform 110.

With reference to FIG. 2D, at step 218, the received first user response data may be evaluated. For instance, the received first user response data may be compared to one or more criteria used to determine eligibility for the identified product. If the first user response data does not meet the criteria, the request for the product may be denied and a notification may be transmitted to the user.

If the received first user response data meets the criteria, at step 219, the identified product may be executed. Execution of the product may include notifying the first user that the request for the product has been approved, identifying one or more terms of the product, and the like.

At step 220, cross-relational matching functionality may be enabled. For instance, one or more functions that were previously disabled may be enabled, activated, or initiated. In some examples, this enabling of functionality may be performed in response to execution of the identified product. Additionally or alternatively, the functionality may be enabled in response to qualifying criteria of the first user being identified in the evaluated first user response data.

At step 221, a plurality of eligible users to whom an offer to invest in the identified product may be identified. For instance, the entity (e.g., financial institution) providing the identified product to the first user may offer to permit one or more eligible users to invest in the identified product (e.g., provide funds to the first user via the first product). In some examples, machine learning may be used to identify the plurality of eligible users (e.g., based on one or more criteria and one or more datasets or predetermined rules).

At step 222, requests for user data associated with each user of the plurality of eligible users may be generated. For instance, data associated with interests, purchase history, account information, and the like, may be requested.

Figure 2E:
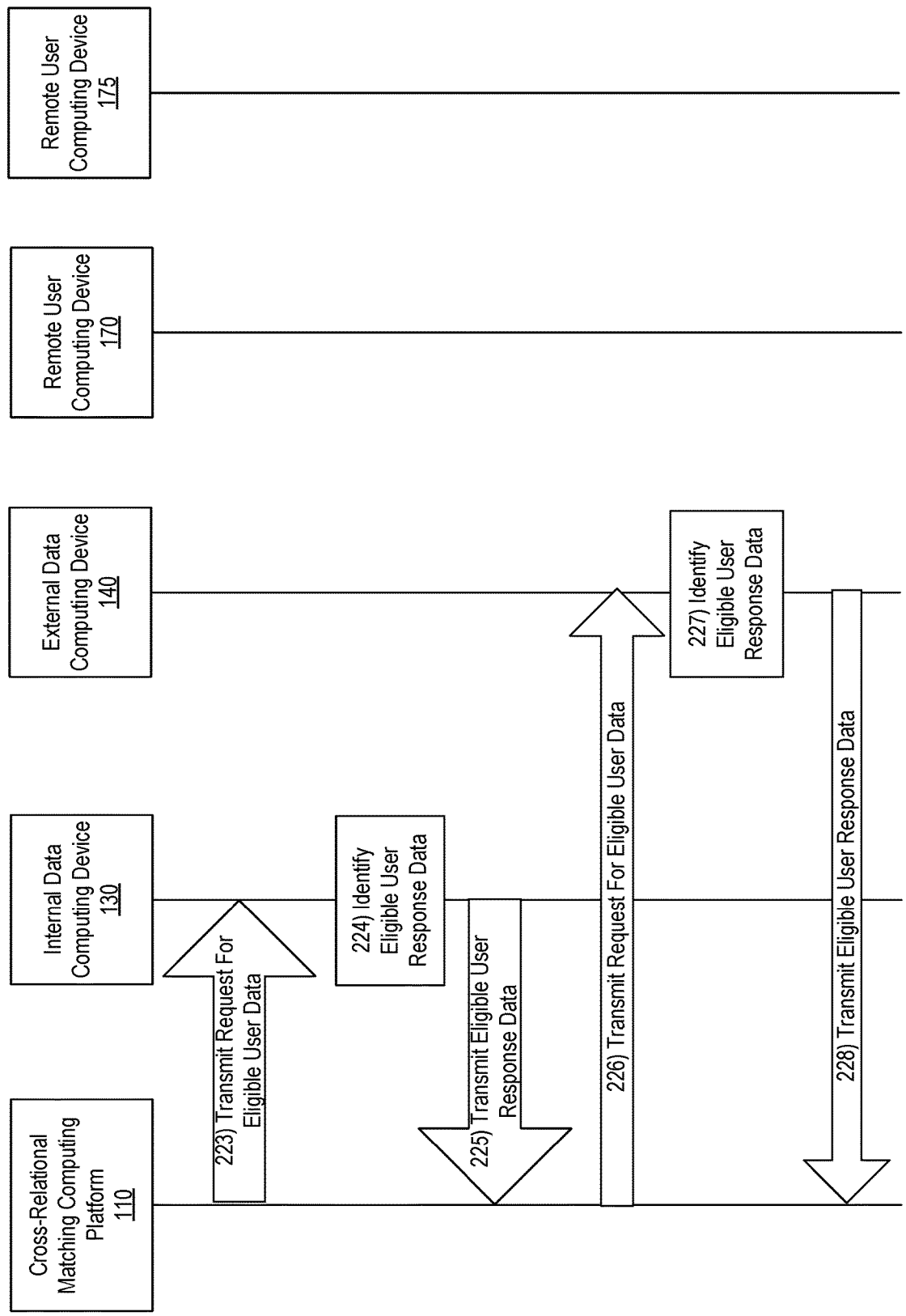

With reference to FIG. 2E, at step 223, the generated request for data associated with the plurality of eligible users may be transmitted from the cross-relational matching computing platform 110 to the internal data computing device 130. For instance, the request for data associated with the plurality of eligible users may be transmitted during the communication session initiated upon establishing the second wireless connection.

At step 224, eligible user response data may be identified and retrieved. For instance, the requested eligible user data may be retrieved from one or more databases and response data may be generated. At step 225, the generated eligible user response data may be transmitted from the internal data computing device 130 to the cross-relational matching computing platform 110.

At step 226, the generated request for data associated with the plurality of eligible users may be transmitted from the cross-relational matching computing platform 110 to the external data computing device 140. For instance, the request for data associated with the plurality of eligible users may be transmitted during the communication session initiated upon establishing the third wireless connection.

At step 227, eligible user response data may be identified and retrieved. For instance, the requested eligible user data may be retrieved from one or more databases and response data may be generated. At step 228, the generated eligible user response data may be transmitted from the external data computing device 140 to the cross-relational matching computing platform 110.

With reference to FIG. 2F, at step 229, the eligible user response data may be received by the cross-relational matching computing platform 110 (e.g., from internal data computing device 130, external data computing device 140).

At step 230, the received eligible user response data may be evaluated. At step 231, based on the eligible user response data, one or more eligible users of the plurality of eligible users may be matched to the identified product. In some examples, the matching may be performed using machine learning. For instance, a subset of eligible users from the plurality of eligible users may be identified by matching the eligible users to one or more predefined rules, criteria, or the like, for identifying users who should be provided an offer to invest in the identified product. As discussed above, this may be based on behaviors or interest of the user (in some examples, this may be retrieved from social media data associated with the eligible user, purchase history, or the like), historical data, account data, and the like. In some examples, the subset may be fewer than all of the plurality of eligible users.

At step 232, a user interface to be presented to the subset of users may be generated. In some examples, the user interface may include a plurality of products available for selection (e.g., available for investment by the subset of eligible users). The plurality of products available may include the identified product.

At step 233, a connection may be established between the cross-relational matching computing platform 110 and one or more computing devices associated with the eligible users of the subset of eligible users. For instance, a fourth wireless connection may be established between the cross-relational matching computing platform 110 and remote user computing device 175. Upon establishing the fourth wireless connection, a communication session may be initiated between the cross-relational matching computing platform 110 and the remote user computing device 175.

Figure 2G:
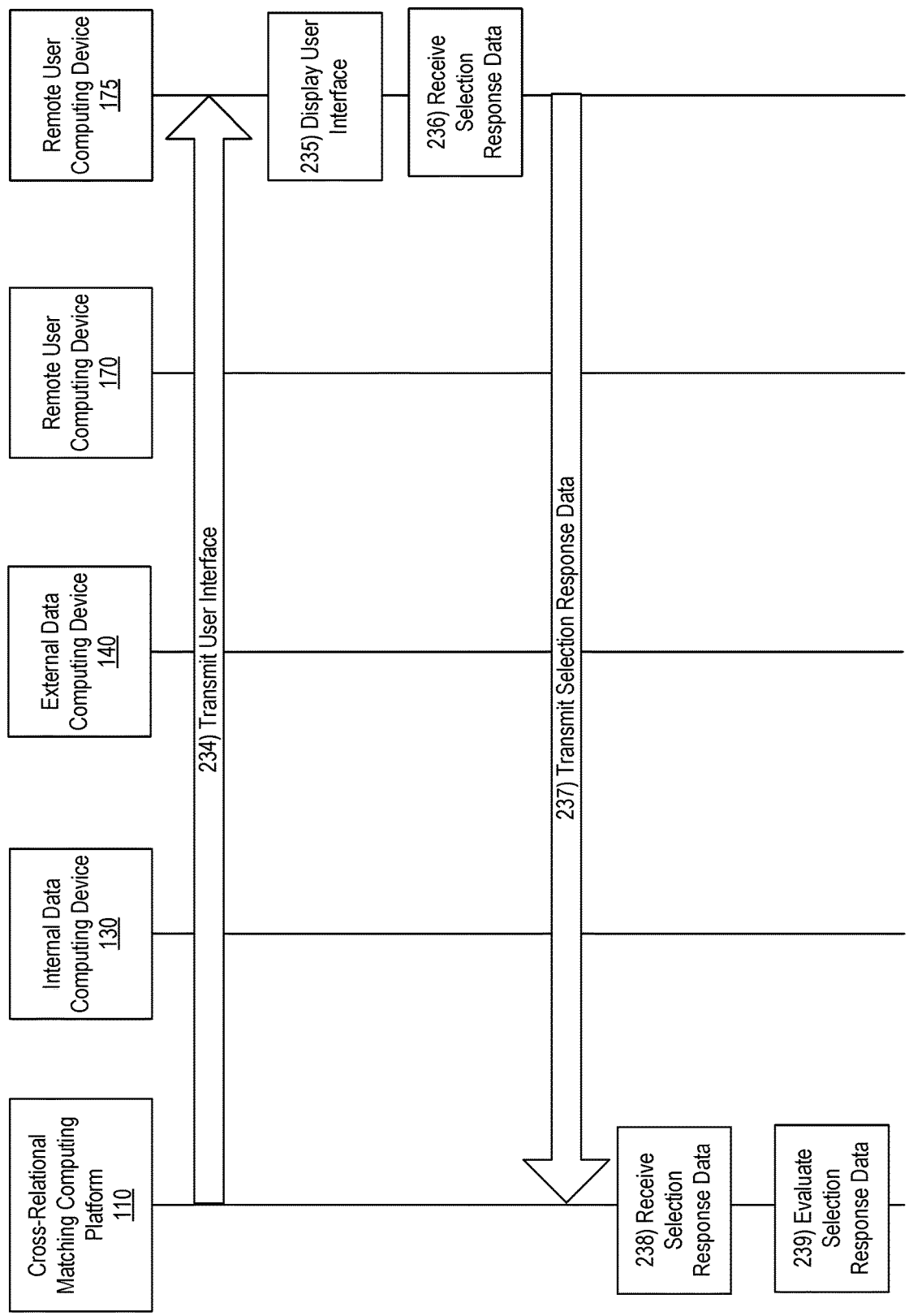

With reference to FIG. 2G, at step 234, the generated user interface may be transmitted from the cross-relational matching computing platform 110 to the remote user computing device 175. For instance, the generated user interface may be transmitted during the communication session initiated upon establishing the fourth wireless connection.

At step 235, the user interface may be received by the remote user computing device 175 and displayed on a display of the remote user computing device 175.

At step 236, user selection of a product from the user interface may be received by the remote user computing device 175. In some examples, the selected product may be the identified product. Selection response data (e.g., data corresponding to selection of the identified product) may be generated by the remote user computing device 175. At step 237, the generated selection response data may be transmitted from the remote user computing device 175 to the cross-relational matching computing platform 110.

At step 238, the selection response data may be received by the cross-relational matching computing platform 110. At step 239, the selection response data may be evaluated. For instance, the product selected may be identified and data associated with the product may be retrieved (e.g., parameters of the product, terms, or the like).

Figure 2H:
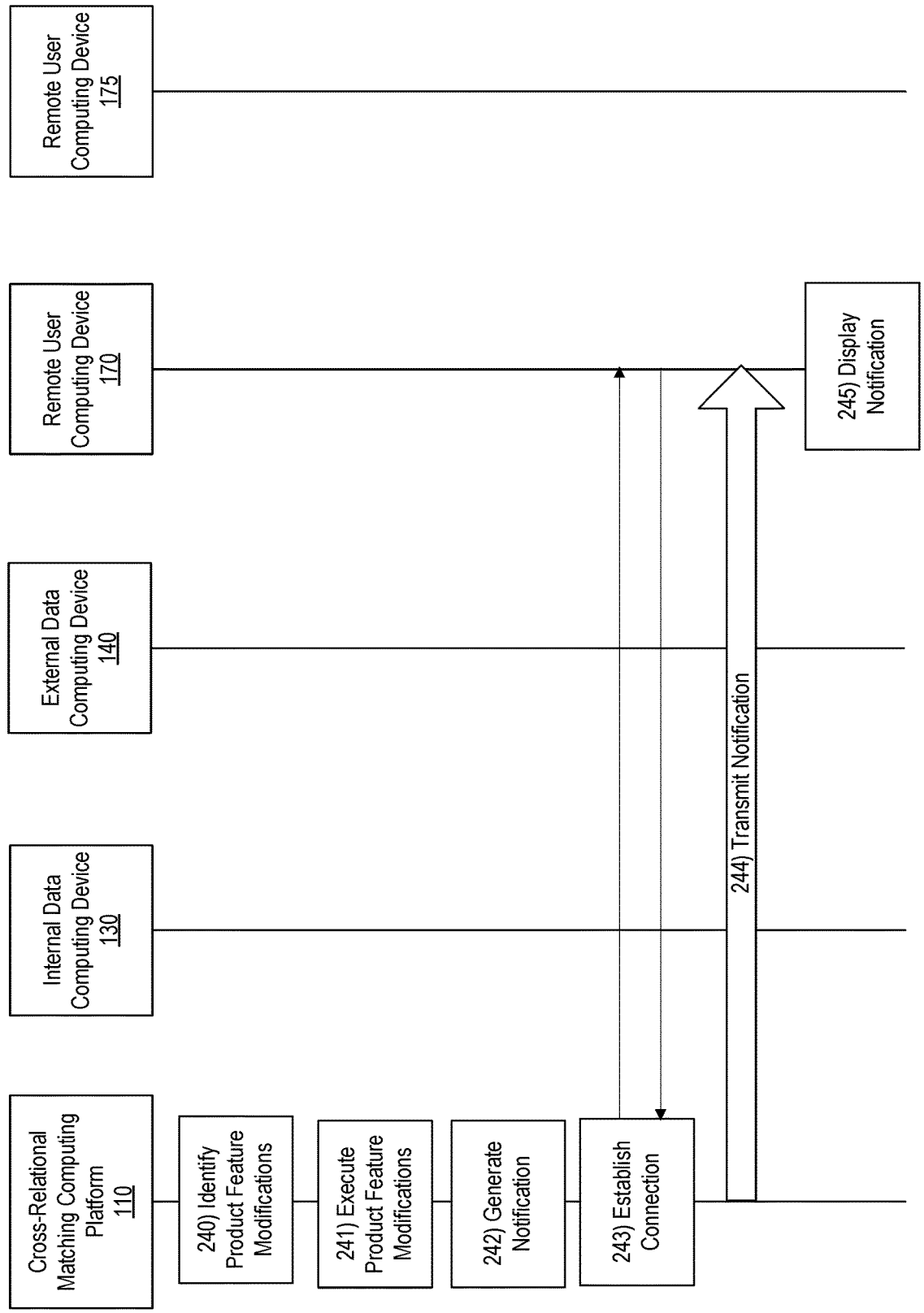

With reference to FIG. 2H, at step 240, one or more product feature modifications may be identified. For instance, one or more terms of the product (e.g., interest rate, term, or the like) may be modified based on, for example, an eligible user who has selected the product. For example, the eligible user may request different terms, might only be willing to provide a portion of the funds or any funds but for a shorter than requested period of time, or the like. Accordingly, one or more modifications to product features may be identified.

At step 241, the identified modifications to the product features may be executed. At step 242, a notification may be generated. In some examples, the notification may include information associated with the product feature modifications, eligible users who selected the product, and the like.

At step 243, a connection may be established between the cross-relational matching computing platform 110 and the computing device of the first user requesting the product (e.g., remote user computing device 170). For instance, a fifth wireless connection may be established between the cross-relational matching computing platform 110 and remote user computing device 170. Upon establishing the fifth wireless connection, a communication session may be initiated between the cross-relational matching computing platform 110 and the remote user computing device 170.

At step 244, the generated notification may be transmitted from the cross-relational matching computing platform 110 to the remote user computing device 170. For instance, the generated notification may be transmitted during the communication session initiated upon establishing the fifth wireless connection.

At step 245, the notification may be received by the remote user computing device 170 and may be displayed on a display of the remote user computing device 170.

Figure 3:
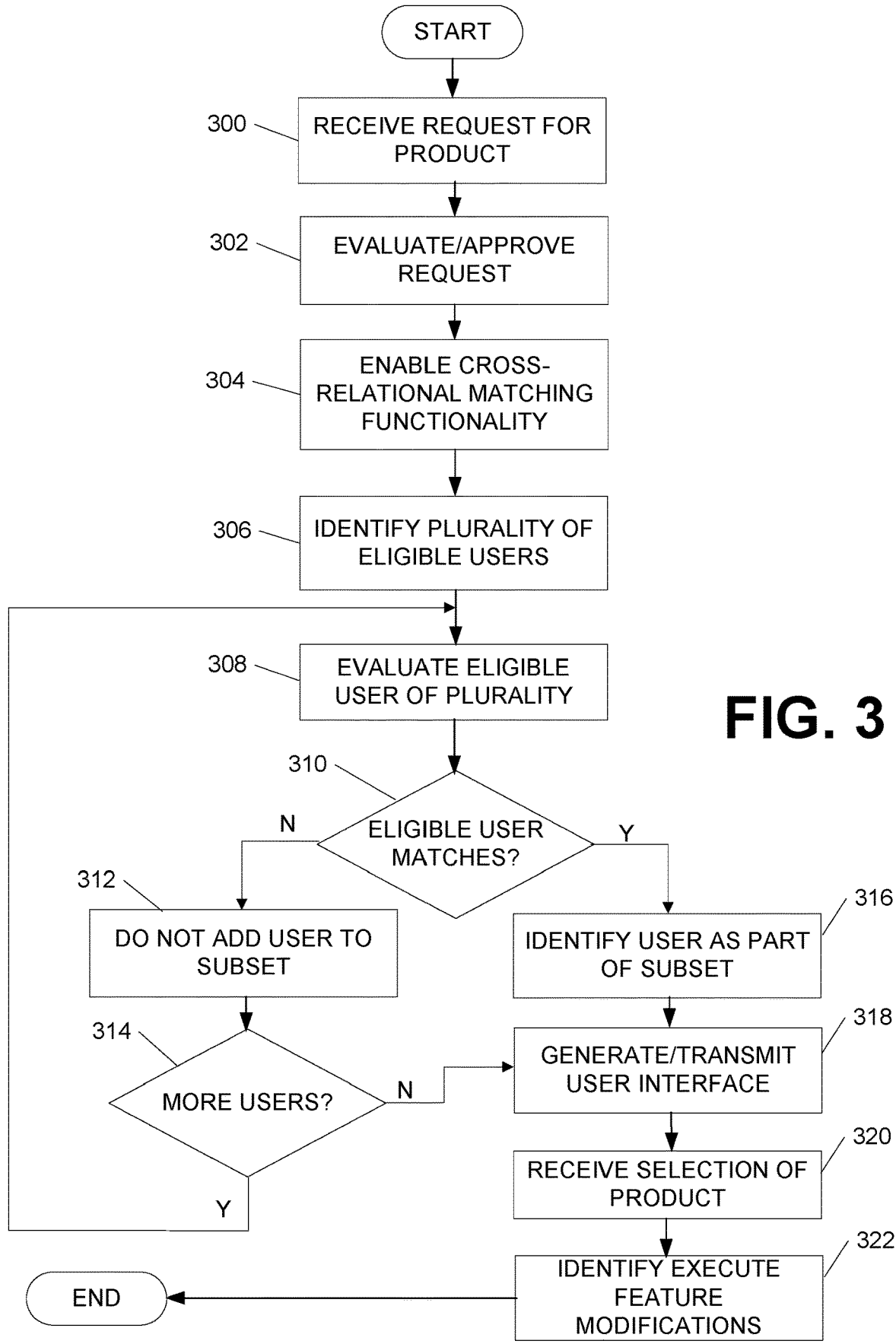
FIG. 3 depicts an illustrative method for implementing and using a system to perform cross-relational matching functions, according to one or more aspects described herein.

FIG. 3 is a flow chart illustrating one example method of providing cross-relational matching functions according to one or more aspects described herein. The processes illustrated in FIG. 3 are merely some example processes and functions. The steps shown may be performed in a different order, more steps may be added, or one or more steps may be omitted without departing from the invention.

At step 300, a request for a product may be received. In some examples, the request may be received from a computing device of a first user (e.g., remote user computing device 170) and may include additional information associated with the user, request, requested parameters, and the like.

At step 302, the request for a product may be evaluated and/or approved. For instance, the request and associated information may be compared to criteria for one or more products meeting the request to determine whether the first user is qualified for the requested product. If not, a notification may be transmitted to the first user. If so, the requested product may be approved.

At step 304, cross-relational matching functionality may be enabled. For instance, features associated with cross-relational matching that were previously disabled or otherwise unavailable may be enabled, activated or initiated.

At step 306, a plurality of eligible users may be identified. For instance, machine learning may be used to identify a plurality of users eligible to receive an offer to invest in the requested product (and/or other products as desired). The eligible users may be identified based on interest data (e.g., from social media sites), behavioral data, purchase history data, and the like.

At step 308, a user of the eligible plurality of users may be evaluated to determine whether the user is a match for the product being offered. For example, although a plurality of eligible users may be broadly identified, further evaluation (e.g., via machine learning) may be used to refine the users to a subset of users who are likely to be interested in the particular product (e.g., based on interest data, account data, purchase history data, investment history and current investments, and the like).

At step 310, a determination may be made as to whether the eligible user being evaluated matches criteria, predefined rules, or the like, indicating that the eligible user is likely to be interested in investing in the requested product. If so, the evaluated eligible user may be added to a subset of eligible users who will be displayed an offer to invest in the requested product (and/or other products).

If, at step 310, a determination is made that the eligible user being evaluated is not a match, the eligible user might not be added to a subset of users interested in step 312. At step 314, a determination may be made as to whether there are additional eligible users of the plurality of eligible users for evaluation. If so, the process may return to step 308 to evaluate another eligible user. If not, the process may proceed to step 318.

At step 318, a user interface including the requested product and/or other products available for investment may be generated. The generated user interface may then be transmitted to a computing device of users in the subset of eligible users and displayed on the device.

At step 320, selection of a product from the user interface may be received. At step 322, one or more product feature modifications may be identified and executed.

Figure 4:
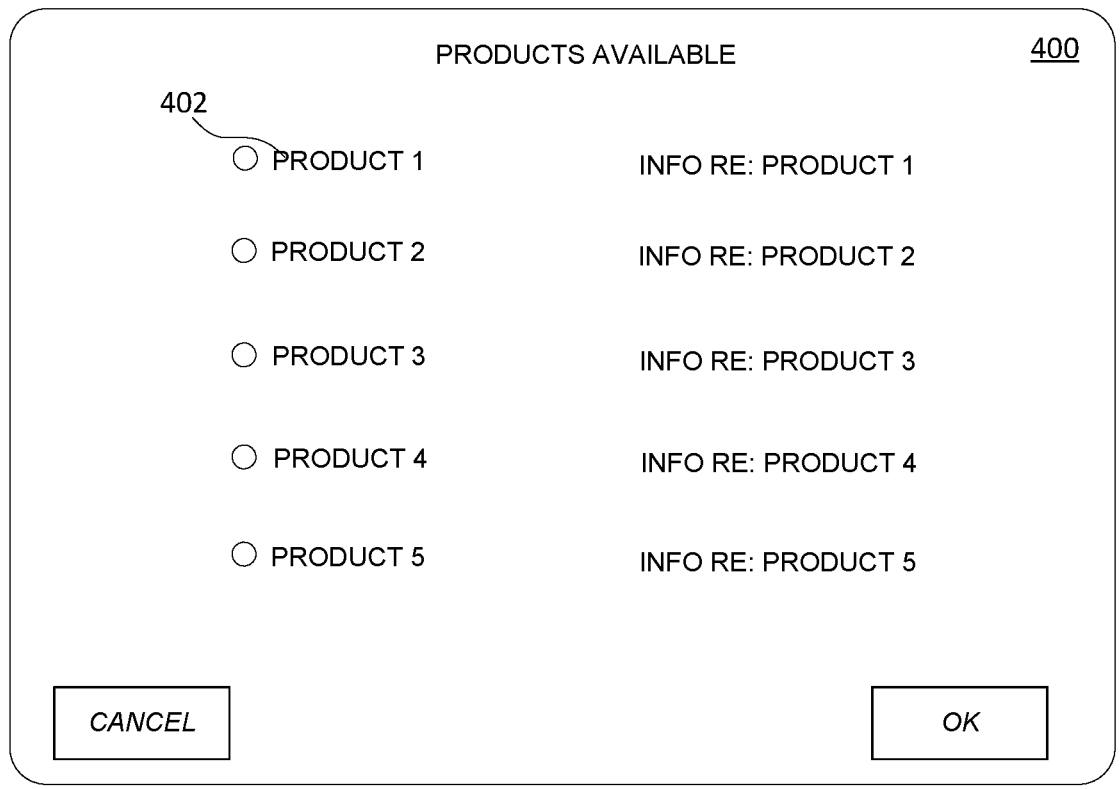
FIG. 4 illustrates one example user interface that may be generated in accordance with one or more aspects described herein.

FIG. 4 illustrates one example user interface that may be displayed to the subset of eligible users including a plurality of products available for investment in accordance with one or more aspects described herein. The interface 400 includes a listing 402 of a plurality of products, as well as information associated with each product. For instance, the information may include a type of product, reason the product was requested, tax incentives associated with the product, and the like. The user may select a radio button (or other selection mechanism) in order to select one or more products in which to invest. The user may select "OK" option to process the selection or may select "CANCEL" to cancel any selections made.

Figure 5:
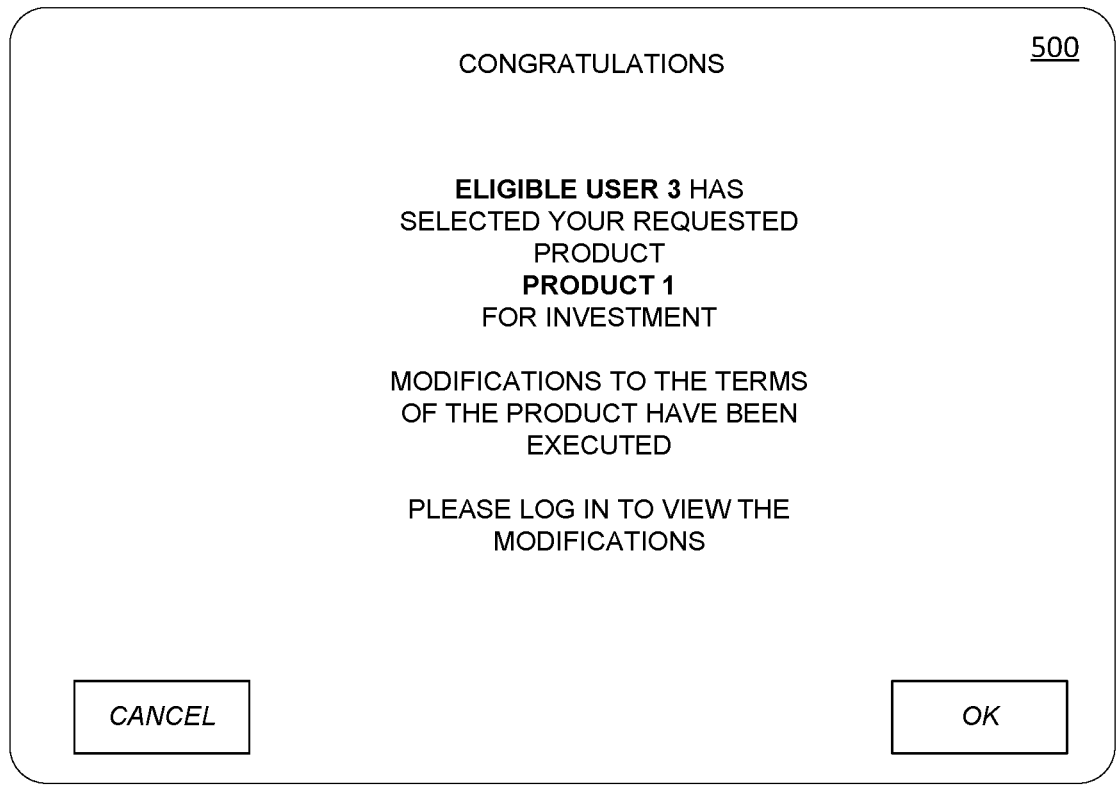
FIG. 5 illustrates another example user interface that may be generated in accordance with one or more aspects described herein.

FIG. 5 illustrates one example user interface including a notification that one or more product feature modifications have been executed. The interface 500 includes data indicating which user selected the product for investment, which product was selected, and the like. In some examples, the notification may be transmitted to a computing device of a first user requesting the product (e.g., remote user computing device 170).

Aspects described herein provide for improved identification of eligible users to provide a product to a requesting user. The arrangements described herein may permit one or more eligible users to select a product, such as a loan requested by a first user different from the plurality of eligible users, and to provide funding in order to provide the loan to the first user. In exchange, the eligible user(s) may receive payment in the form of interest paid on the loan.

For instance, a first user may request a loan, such as a small business loan, home improvement loan, auto loan, or the like. The request may be made to a system of a financial institution. Accordingly, the financial institution may evaluate the request and determine whether the first user is approved for the loan or not. If the user is approved, and with the permission of the first user, one or more cross-relational matching functions may be enabled.

For instance, a plurality of eligible users who may be interested in providing funds for the loan (e.g., in lieu of the financial institution providing some or all of the funds) may be identified. In some examples, the plurality of eligible users may be identified based on historical data, account data, expressed interest by the plurality of eligible users to be considered for arrangements of this nature (e.g., an option to be included has been selected in one or more accounts, user profiles, or the like), or the like.

In some arrangements, each eligible user of the plurality of eligible users may be evaluated to determine whether he or she is a match for the particular product being provided. For instance, machine learning may be used to evaluate each eligible user to determine whether the user is likely to be interested in providing funds for this particular loan. In some examples, this may be based on machine learning datasets linking a likelihood of interest with different user characteristics, loan characteristics, purpose of the loan, or the like. For instance, if the first user is requesting a loan to set up a community garden, eligible users having historical interest in charitable works, gardening, or the like, may be identified as likely to be interested and may be added to a subset of eligible users (e.g., a subset of the plurality of eligible users). In some examples, the subset may be fewer than all users in the identified plurality of eligible users.

After identifying the subset of eligible users, the system may generate a user interface including one or more products available for selection by one or more users of the subset of eligible users. For instance, the requested product may be offered for selection to the subset of eligible users via the generated user interface. In some examples, additional products may also be offered via the user interface. The user interface may be transmitted to computing devices associated with the subset of eligible users.

One or more eligible users may then select the product from the user interface. In some examples, selection of the product may include options for the selecting eligible user to request modification of one or more terms of the product (e.g., a term of the loan, interest rate, or the like). The system may evaluate the request and may evaluate other factors to generate one or more product feature modifications. For instance, if one investing eligible user is willing to provide 50% of the funds but can only provide the money for half the requested term, the term of the loan may be modified, one or more other investors may be identified to provide the funds after the term of the first investing user, or the like). In some examples, the system may generate one or more product feature modifications based on, for example, a number of responding investors (e.g., eligible users of the subset of eligible users), amount of funds provided by investors, or the like.

The one or more product feature modifications may be executed and a notification may be transmitted to the first user requesting the product. In some examples, the first user may have an option to decline the product based on the product feature modifications (e.g., if an interest rate is too high, if a term is too short, or the like). The notification may, in some examples, include an option to accept or decline the product with the modifications (e.g., "OK" or "CANCEL" option in FIG. 5).

Accordingly, the system allows for various eligible users to provide funds for a loan to a requesting user. Although one or more individual investors may be providing funds, the loan may be managed, and/or the system implemented by, a financial institution. In some examples, the investors may receive a return on their investment in the form of interest paid on the loan by the first user.

In arrangements in which an insufficient number of investors or amount of funds provided by investors is received, the financial institution may provide the remainder of the funds. Accordingly, risk is distributed among all parties providing funds for the loan.

Although several examples discussed herein are described in the context of small amount loans, the arrangements discussed herein may also be used in loans of larger amounts. For instance, if a developer is rehabilitating a building to make it more environmentally friendly, LEED certified, or the like, investors interested in environmental causes, with an interest in the particular neighborhood of the building, or the like, may be offered an opportunity to invest in the loan.

In some arrangements, investors might receive additional returns beyond merely interest rates. For instance, eligible users can invest in projects or loans that have significance to them personally. For example, loans benefiting particular charities or causes, loans improving property values in a neighborhood significant to the investing user, and the like may provide the investing user with the satisfaction of knowing they helped a cause.

Although several aspects discussed herein are discussed in the context of individuals requesting products such as loan, individuals investing in the loans, and the like, the arrangements discussed herein may be implemented at a corporate level as well. For instance, suppliers of parts for large manufacturers may be able to receive funding from the large manufacturer via the arrangements discussed herein, thereby receiving the benefits of better loan terms that may be provided to the large manufacturer. In some arrangements, the corporate entities may identify limits or other parameters for amount that may be contributed or borrowed, interest rate limits, payback terms, and the like.

In some examples, the generated user interface providing options for investment to eligible users may be provided via an investor portal. The investor portal may include registration information in which the investing users provide information related to interests, desired investment opportunities or types of opportunities, amount limits, term limits, and the like. In some examples, the system may track products selected by the investing user and may use that information to validate or update machine learning datasets so that the user will be matched to similar opportunities in the future.

In some examples, the system may identify opportunities for a user based on account information. For example, a routine review of funds in a user's savings account may indicate an opportunity to invest a particular amount of funds to earn more interest than in the savings account. Accordingly, the system may generate and transmit a notification to the potential investor flagging the opportunity to be involved in an investment such as those described herein.

In some examples, the systems and arrangements described herein may provide for more guided lending. For instance, a user may request a first type of loan. However, the system may identify that it would be more advantageous for the user to receive a loan having, for example, eligible user investors such that those described herein. Accordingly, the system may generate and transmit a notification indicating that it might be advantageous for the user (e.g., lower interest rate, or the like) to receive a loan other than the type requested. The user may then accept or decline the offer.

In some arrangements, loans fitting a certain category may be given a higher priority than other loans. For instance, a loan request to pay for a medical condition or treatment may be treated with a higher priority than other types of loans. A higher priority may include displaying this loan at a top of a user interface providing loans to eligible user investors for selection, offering the loan to more eligible users, and the like.

In some examples, an eligible user investor may input a desired return on investment to the system and, based on the requested return on investment, the system may identify one or more loans in which to invest. For instance, the system may identify a plurality of loans having different terms that, when considering the return over all loans, may meet the requested parameters.

In some examples, an eligible user investor may invest different loans having different parameters or terms in order to distribute risk across multiple investments. For instance, a portion of available funds may be invested in a loan at a first rate while the remainder may be invested in a loan at a different rate. Accordingly, the risk to the eligible user investor is spread across multiple loans.

The above-described examples and arrangements are merely some example arrangements in which the systems described herein may be used. Various other arrangements employing aspects described herein may be used without departing from the invention.

Figure 6:
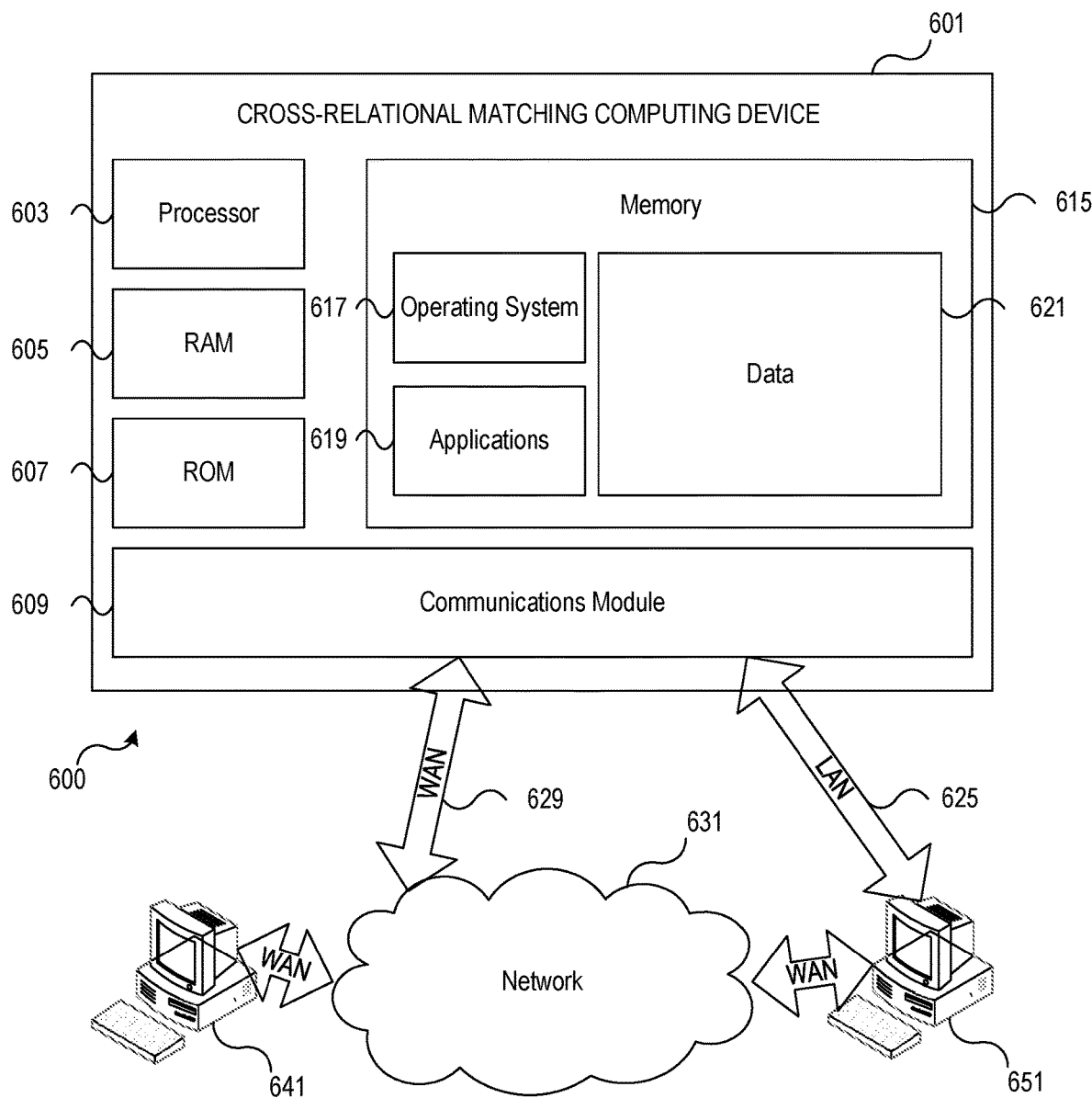
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include cross-relational matching computing device 601 having processor 603 for controlling overall operation of cross-relational matching computing device 601 and its associated components, including Random Access Memory (RAM) 605, Read-Only Memory (ROM) 607, communications module 609, and memory 615. Cross-relational matching computing device 601 may include a variety of computer readable media. Computer readable media may be any available media that may be accessed by cross-relational matching computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on cross-relational matching computing device 601. Such a processor may execute computer-executable instructions stored on a computer-readable medium.

Software may be stored within memory 615 and/or storage to provide instructions to processor 603 for enabling cross-relational matching computing device 601 to perform various functions as discussed herein. For example, memory 615 may store software used by cross-relational matching computing device 601, such as operating system 617, application programs 619, and associated database 621. Also, some or all of the computer executable instructions for cross-relational matching computing device 601 may be embodied in hardware or firmware. Although not shown, RAM 605 may include one or more applications representing the application data stored in RAM 605 while cross-relational matching computing device 601 is on and corresponding software applications (e.g., software tasks) are running on cross-relational matching computing device 601.

Communications module 609 may include a microphone, keypad, touch screen, and/or stylus through which a user of cross-relational matching computing device 601 may provide input, and may also include one or more of a speaker for providing audio output and a video display device for providing textual, audiovisual and/or graphical output. Computing system environment 600 may also include optical scanners (not shown).

Cross-relational matching computing device 601 may operate in a networked environment supporting connections to one or more remote computing devices, such as computing devices 641 and 651. Computing devices 641 and 651 may be personal computing devices or servers that include any or all of the elements described above relative to cross-relational matching computing device 601.

The network connections depicted in FIG. 6 may include Local Area Network (LAN) 625 and Wide Area Network (WAN) 629, as well as other networks. When used in a LAN networking environment, cross-relational matching computing device 601 may be connected to LAN 625 through a network interface or adapter in communications module 609. When used in a WAN networking environment, cross-relational matching computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
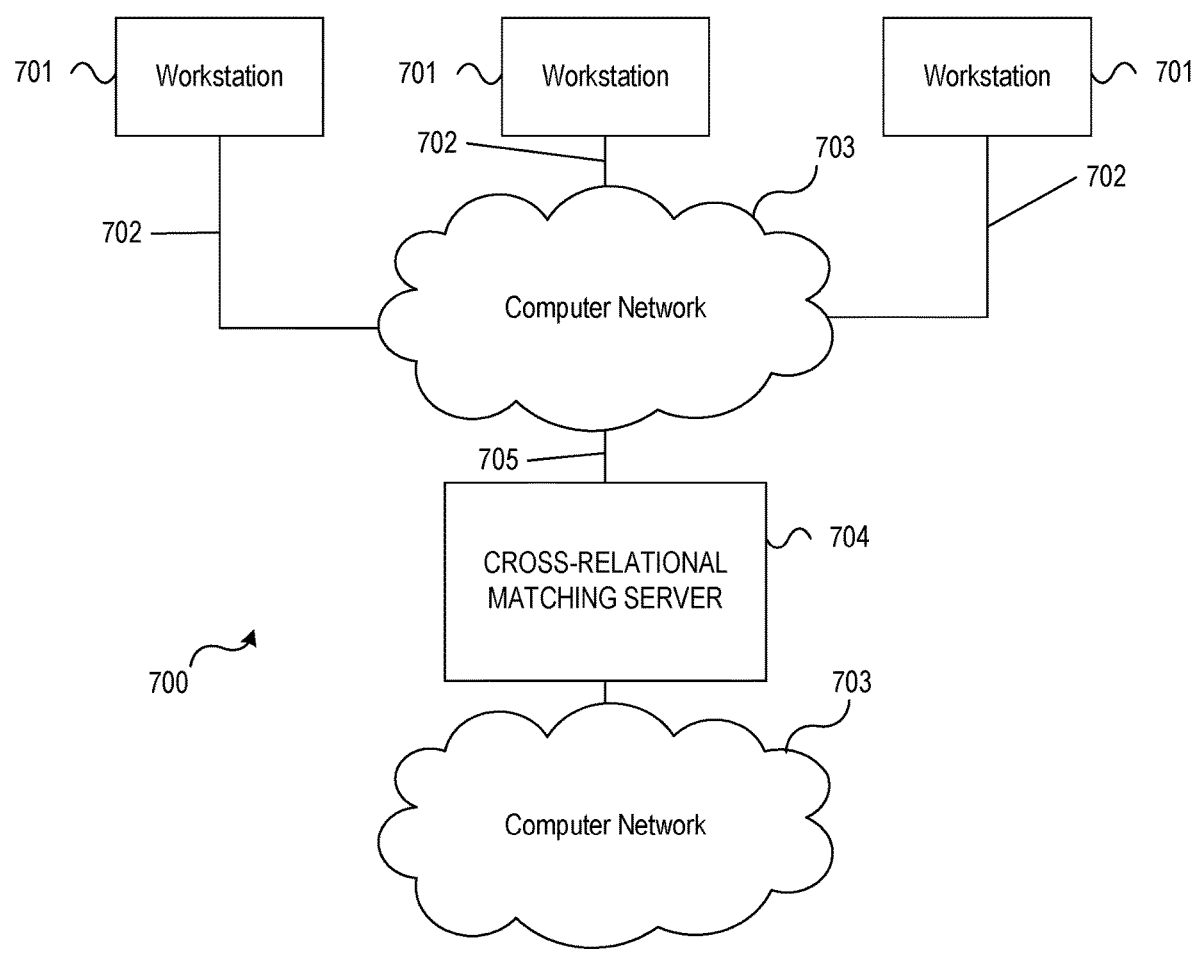
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to cross-relational matching server 704. In system 700, cross-relational matching server 704 may be a server, processor, computer, or data processing device, or combination of the same, configured to perform the functions and/or processes described herein. Server 704 may be used to receive requests for products, evaluate requests for products, identify a plurality of eligible users, evaluate the plurality of eligible users to identify a subset of eligible users, generate user interfaces, receive selection of a product, modify product features, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and cross-relational matching server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
generate, based on received data related to eligible users and by a machine learning engine using one or more machine learning algorithms, one or more machine learning datasets linking characteristics of the eligible users to one or more loan products including a first loan;
receive, from a computing device of a first user different from the eligible users, a request for the first loan of the one or more loan products;
evaluate the request for the first loan to determine whether one or more qualifying criteria are met;
responsive to determining that the one or more qualifying criteria are not met:
generating a first notification; and
transmit the first notification to the computing device of the first user;
responsive to determining that the one or more qualifying criteria are met:
approve the request for the first loan; and
perform cross-relational matching functions, cross-relational matching functions including:
identifying a plurality of eligible users to provide at least a portion of the first loan to the first user;
analyzing, using the one or more machine learning datasets, each eligible user of the plurality of eligible users to generate a subset of eligible users, the subset of eligible users including potential loan providers having an interest in a characteristic of the first loan;
generating, based on the analyzing using the one or more machine learning datasets, a user interface including the first loan for selection and additional loans available for selection by the potential loan providers;
transmitting the user interface to computing devices associated with the potential loan providers;
receiving, from at least one computing device of at least one potential loan provider, selection of the first loan via the user interface, selection of the first loan including selection by the at least one potential loan provider to provide the at least a portion of the first loan to the first user;
generating one or more loan feature modifications;
modifying parameters of the first loan based on the generated one or more loan feature modifications; and
updating the one or more machine learning datasets based on the received selection.

2. The computing platform of claim 1, wherein the one or more loan feature modifications include a modification to a first parameter of the first loan.

3. The computing platform of claim 1, wherein analyzing each user of the plurality of eligible users includes retrieving data associated with each user of the plurality of eligible users.

4. The computing platform of claim 3, wherein the data associated with each eligible user of the plurality of eligible users is retrieved from a computing device internal to an entity associated with the computing platform.

5. The computing platform of claim 3, wherein the data associated with each eligible user of the plurality of eligible users is retrieved from a computing device external to an entity associated with the computing platform.

6. The computing platform of claim 1, further including instructions that, when executed, cause the computing platform to:
after modifying the parameters of the first loan based on the generated one or more loan feature modifications, generate a second notification.

7. The computing platform of claim 1, wherein the instructions further cause the computing platform to:
determine that an amount of the first loan is not covered by the at least one potential loan provider; and
obtain additional funds for the first loan from a financial institution different from the potential loan providers, and
wherein the computing platform is associated with the financial institution.

8. A method, comprising:
at a computing platform comprising at least one processor, memory, and a communication interface:
generating, by the at least one processor, based on received data related to eligible users and by a machine learning engine using one or more machine learning algorithms, one or more machine learning datasets linking characteristics of the eligible users to one or more loan products including a first loan;
receiving, by the at least one processor, from a computing device of a first user different from the eligible users and via the communication interface, a request for the first loan of the one or more loan products;
evaluating, by the at least one processor, the request for the first loan to determine whether one or more qualifying criteria are met;
if the one or more qualifying criteria are not met:
generating, by the at least one processor, a first notification; and
transmitting, by the at least one processor and via the communication interface, the first notification to the computing device of the first user;
if the one or more qualifying criteria are met:
approving, by the at least one processor, the request for the first loan; and
performing, by the at least one processor, cross-relational matching functions, cross-relational matching functions including:
identifying, by the at least one processor, a plurality of eligible users to provide at least a portion of the first loan to the first user;
analyzing, by the at least one processor and using the one or more machine learning datasets, each eligible user of the plurality of eligible users to generate a subset of eligible users, the subset of eligible users including potential loan providers having an interest in a characteristic of the first loan;
generating, by the at least one processor and based on the analyzing using the one or more machine learning datasets, a user interface including the first loan for selection and additional loans available for selection by the potential loan providers;

transmitting, by the at least one processor and via the communication interface, the user interface to computing devices associated with the potential loan providers;

receiving, by the at least one processor and from at least one computing device of at least one potential loan provider, selection of the first loan via the user interface, selection of the first loan including selection by the at least one potential loan provider to provide the at least a portion of the first loan to the first user;

generating, by the at least one processor, one or more loan feature modifications;

modifying, by the at least one processor, parameters of the first loan based on the generated one or more loan feature modifications; and updating, by the at least one processor, the one or more machine learning datasets based on the received selection.

9. The method of claim 8, wherein the one or more loan feature modifications include a modification to a first parameter of the first loan.

10. The method of claim 8, wherein analyzing each user of the plurality of eligible users includes retrieving data associated with each user of the plurality of eligible users.

11. The method of claim 10, wherein the data associated with each eligible user of the plurality of eligible users is retrieved from a computing device internal to an entity associated with the computing platform.

12. The method of claim 10, wherein the data associated with each eligible user of the plurality of eligible users is retrieved from a computing device external to an entity associated with the computing platform.

13. The method of claim 8, further including:
after modifying the parameters of the first loan based on the generated one or more loan feature modifications, generating, by the at least one processor, a second notification.

14. The method of claim 13, further including:
transmitting, by the at least one processor and via the communication interface, the generated second notification to the computing device of the first user.

15. One or more non-transitory computer-readable media storing instructions that, when executed by a computing platform comprising at least one processor, memory, and a communication interface, cause the computing platform to:
generate, based on received data related to eligible users and by a machine learning engine using one or more machine learning algorithms, one or more machine learning datasets linking characteristics of the eligible users to one or more loan products including a first loan;
receive, from a computing device of a first user different from the eligible users, a request for the first loan of the one or more loan products;
evaluate the request for the first loan to determine whether one or more qualifying criteria are met;
responsive to determining that the one or more qualifying criteria are not met:
generating a first notification; and
transmit the first notification to the computing device of the first user;

responsive to determining that the one or more qualifying criteria are met:
approve the request for the first loan; and
perform cross-relational matching functions, cross-relational matching functions including:
identifying a plurality of eligible users to provide at least a portion of the first loan to the first user;
analyzing, using the one or more machine learning datasets, each eligible user of the plurality of eligible users to generate a subset of eligible users, the subset of eligible users including potential loan providers having an interest in a characteristic of the first loan;
generating, based on the analyzing using the one or more machine learning datasets, a user interface including the first loan for selection and additional loans available for selection by the potential loan providers;
transmitting the user interface to computing devices associated with the potential loan providers;
receiving, from at least one computing device of at least one potential loan provider, selection of the first loan via the user interface, selection of the first loan including selection by the at least one potential loan provider to provide the at least a portion of the first loan to the first user;
generating one or more loan feature modifications;
modifying parameters of the first loan based on the generated one or more loan feature modifications; and
update the one or more machine learning datasets based on the received selection.

16. The one or more non-transitory computer-readable media of claim 15, wherein the one or more loan feature modifications include a modification to a first parameter of the first loan.

17. The one or more non-transitory computer-readable media of claim 15, wherein analyzing each user of the plurality of eligible users includes retrieving data associated with each user of the plurality of eligible users.

18. The one or more non-transitory computer-readable media of claim 17, wherein the data associated with each eligible user of the plurality of eligible users is retrieved from a computing device internal to an entity associated with the computing platform.

19. The one or more non-transitory computer-readable media of claim 17, wherein the data associated with each eligible user of the plurality of eligible users is retrieved from a computing device external to an entity associated with the computing platform.

20. The one or more non-transitory computer-readable media of claim 15, further including instructions that, when executed, cause the computing platform to:
after modifying the parameters of the first loan based on the generated one or more loan feature modifications, generate a second notification.

21. The one or more non-transitory computer-readable media of claim 20, further including instructions that, when executed, cause the computing platform to:
transmit the generated second notification to the computing device of the first user.

* * * * *